(12) United States Patent
Wong

(10) Patent No.: US 7,850,861 B1
(45) Date of Patent: Dec. 14, 2010

(54) MICROFLUIDIC DEVICE, AND RELATED METHODS

(75) Inventor: Eric W. Wong, Los Angeles, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 848 days.

(21) Appl. No.: 11/764,359

(22) Filed: Jun. 18, 2007

(51) Int. Cl.
*C23F 1/00* (2006.01)

(52) U.S. Cl. .............................. 216/2; 216/37; 438/48; 438/53; 137/15.01; 137/13

(58) Field of Classification Search ............... 216/2, 216/37; 438/48, 53; 137/15.01, 13
See application file for complete search history.

(56) References Cited

U.S. PATENT DOCUMENTS

| | | | |
|---|---|---|---|
| 5,077,241 A * | 12/1991 | Moh et al. ............... 501/84 |
| 6,210,986 B1 * | 4/2001 | Arnold et al. ............ 438/42 |
| 6,499,499 B2 | 12/2002 | Dantsker et al. | |
| 6,595,232 B2 | 7/2003 | Guzman et al. | |
| 6,753,200 B2 | 6/2004 | Craighead et al. | |
| 6,818,184 B2 | 11/2004 | Fulwyler et al. | |
| 6,845,787 B2 | 1/2005 | Karp et al. | |
| 6,848,462 B2 | 2/2005 | Covington et al. | |
| 6,976,384 B2 | 12/2005 | Hobbs et al. | |
| 7,595,195 B2 * | 9/2009 | Lee et al. ................ 436/52 |
| 2003/0209314 A1 | 11/2003 | Guo et al. | |
| 2005/0242017 A1 | 11/2005 | Staats | |

OTHER PUBLICATIONS

D. Mattia et al. Nanotechnology 18, (2007) pp. 1-7.*
J. Atencia et al. Nature vol. 437, Sep. 2005 pp. 648-655.*
Lopez, et al., In Site Fabricated Microchannels Using Porous Polymer and Zenon Difluoride Etchant, Carnegie Mellon University.

* cited by examiner

Primary Examiner—Shamim Ahmed
Assistant Examiner—Maki A Angadi
(74) Attorney, Agent, or Firm—Mark Homer

(57) ABSTRACT

A method of making a microfluidic device is provided. The method features patterning a permeable wall on a substrate, and surrounding the permeable wall with a solid, non-permeable boundary structure to establish a microfluidic channel having a cross-sectional dimension less than 5,000 microns and a cross-sectional area at least partially filled with the permeable wall so that fluid flowing through the microfluidic channel at least partially passes through the permeable wall.

26 Claims, 5 Drawing Sheets

MICROFLUIDIC DEVICE, AND RELATED METHODS

STATEMENT OF GOVERNMENT INTEREST

The invention described hereunder was made in the performance of work under a NASA contract, and is subject to the provisions of Public Law #96-517 (35 U.S.C. 202) in which the Contractor has elected not to retain title.

FIELD OF THE INVENTION

The present invention relates to microfluidic devices containing permeable structural components integrated into microfluidic channels, and to methods of making and using the microfluidic devices. Applications in which the microfluidic devices are useful include chromatographic separations, filtrations, chemical and biological detection and identification, lab-on-chip environments, and microelectromechanical systems.

BACKGROUND OF THE INVENTION

Microfluidic and nanofluidic (hereinafter collectively referred to as microfluidic) technologies provide promising alternatives for acquiring information from and detecting chemical and biological samples. Biochemical and chemical reactions, processes, separation, identification, and detection, both simple and complex, can be carried out using microfluidic technology. Microfluidic technology provides many benefits over conventional systems. These benefits include, for example, smaller sample sizes, ease of portability, reduced laboratory area requirements, and shorter processing periods. As a consequence of these many benefits, microfluidic technology has attracted interest in a variety of technical disciplines for use in diverse applications. Examples of some applications for which microfluidic technology is particularly suited include chromatographic separations, filtrations, analytical chemistry, chemical and biological synthesis, DNA amplification, and screening of chemical and biological agents for activity. It is envisioned that many of these applications will be carried out on what are known as miniaturized lab-on-chips and microelectromechanical (MEM) systems.

Liquid chromatography is a physical separation technique in which a liquid mobile phase, typically containing a solvent, carries a sample containing multiple constituents or species (e.g., proteins and other biomolecules) along a column or trench containing one more packing materials, which interact with the sample to separate sample constituents or species from one another. In the context of a microfluidic system, the packing materials are deposited in a microfluidic channel having a width and/or depth on the order of tenths of nanometers to a few millimeters. Interaction between the packing materials and liquid mobile phase which effects separation of chemical constituents and biological agents may involve, for example, adsorption, ion exchange, partitioning, and size exclusion.

In some applications it is desirable to fill the entire microfluidic channel with packing material, whereas in other applications it is desirable to fill less than the entire microfluidic channel with the packing material. A partially filled microfluidic channel may take several forms, with each form possessing its own advantages. For example, according to one embodiment, partial filling of the microfluidic channel may create a continuous permeable wall extending along the microfluidic channel, with a coextensive vacant space extending longitudinally between the permeable material and the base surface of the microfluidic channel. The provision of the continuous vacant area above or below the permeable wall may, for example, reduce the pressure requirement for flowing an analyte solution through the microfluidic channel. According to another embodiment, differing packing materials are packed into discrete longitudinal segments of the microfluidic channel, with adjacent packing material segments either contacting one another or being spaced apart from one another lengthwise along the microfluidic channel. The provision of multiple distinct packing material segments along a portion or the entire length of the microfluidic channel permits the fluid sample to interact with multiple different materials, permitting analyses of multiple interactions and, depending upon the particular packing materials selected, enhancing constituent/agent separation of the sample.

One manner of attempting to fill or partially fill a microfluidic channel is to pack micro- or nano-particles into the channel after substrates defining the microfluidic channel have been assembled together. It is believed that this post-assembly packing technique would be problematic because the extremely small dimensions of the channels would make it difficult, if not impossible in some situations, to apply sufficient pressure for forcing the particles into and along the entire length of the channels without rupturing the bond between the substrates. Another envisioned problem of this post-assembly packing technique would relate to the handling of micro-sized packing micro- and nano-particles. It is further believed that this post-assembly packing technique also would not be conducive towards controlling the partial filling of microfluidic channels. Using this technique, it would be difficult to create a permeable wall of uniform wall height or permeable wall discrete section spaced apart from one another longitudinally along the microfluidic channel.

Another technique that could be attempted for packing microfluidic channels is to pack the particles into microfluidic channels of a first substrate, then to assemble a second substrate on the first substrate and thereby enclose the microfluidic channel. It is believed that this fabrication technique would be problematic with regard to its handling of micro-sized packing materials. It is further believed that it would be difficult to create a uniform wall height with uniform spacing from the channel base for creating partially filled microfluidic channels.

SUMMARY OF THE INVENTION

According to a first aspect of the invention, a method of making a microfluidic device is provided. The method features patterning a permeable wall on a substrate, and surrounding the permeable wall with a solid, non-permeable boundary structure to establish a microfluidic channel having a cross-sectional dimension less than 5,000 microns and a cross-sectional area at least partially filled with the permeable wall so that fluid flowing through the microfluidic channel at least partially passes through the permeable wall.

A second aspect of the invention involves a method of making a microfluidic device from first and second substrates. The method features patterning a permeable wall on a first substrate, and providing a second substrate comprising a substrate surface with a microfluidic channel, the microfluidic channel having a cross-sectional dimension less than 5,000 microns and a cross-sectional area. The first and second substrates are assembled together to insert the permeable wall into the microfluidic channel with the permeable wall at least partially filling the cross-sectional area of the microfluidic channel so that fluid flowing through the microfluidic channel at least partially passes through the permeable wall.

A third aspect of the invention features a method of making a microfluidic device, comprising patterning a permeable wall on a substrate, and applying a non-permeable coating over the permeable wall to establish a microfluidic channel having a cross-sectional dimension less than 5,000 microns and a cross-sectional area at least partially filled with the permeable wall so that fluid flowing through the microfluidic channel at least partially passes through the permeable wall.

Additional aspects of the invention are directed to microfluidic devices made by the above methods, and methods of employing the microfluidic devices in various applications, such as chromatography, chemical and biological detection and identification using techniques such as spectrometry, and electrochemistry.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings.

Figure 1:
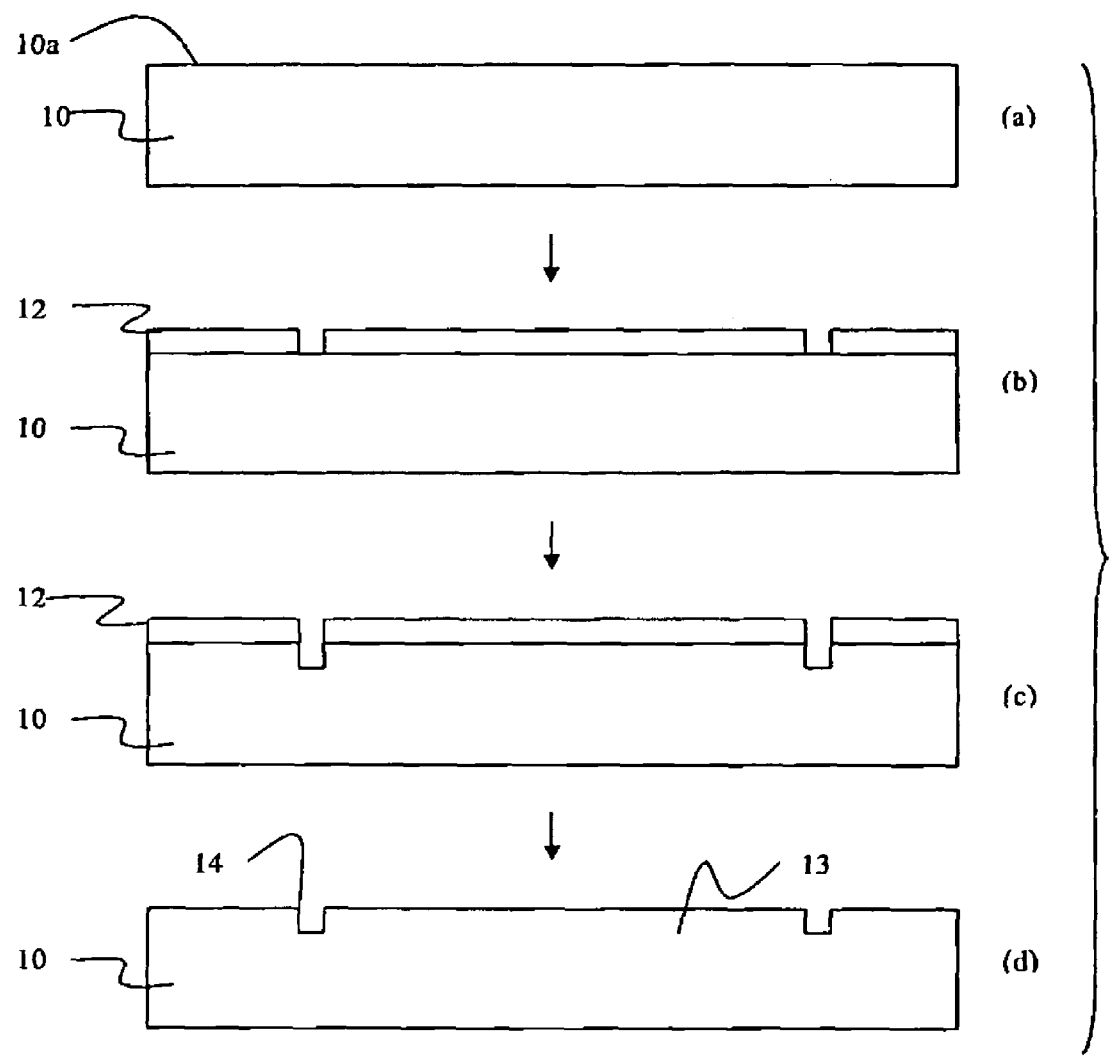
FIGS. 1(a) through 1(d) are schematic illustrations of a sequence of steps of a lithographic procedure for developing microfluidic channels in a substrate.

DETAILED DESCRIPTION OF PREFERRED EMBODIMENTS AND PREFERRED METHODS OF THE INVENTION

Reference will now be made in detail to the presently preferred embodiments and methods of the invention as illustrated in the accompanying drawings, in which like reference numerals designate like features and parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

According to an embodiment of the invention, a method of making a microfluidic device features providing a substrate comprising a substrate surface with a microfluidic channel having a cross-sectional dimension less than 2,000 microns and a cross-sectional area.

FIGS. 1(a)-1(d) illustrate steps of a procedure for making a substrate 10 which will serve as a cover for the assembly to be constructed according to this particular illustrated embodiment. Substrate 10 shown in FIG. 1(a) may be made of a variety of materials suited for the intended methods of the invention, including, by way of example, polymers such as polydimethylsiloxane (PDMS), polymethylmethacrylate (PMMA), and polycarbonates, common semiconductor materials (e.g., crystalline silicon), glass, quartz, and others. It is envisioned that other materials, such as metallized substrates or surface layers that could function as electrodes, for example for applications such as capillary electro-chromatography, electrochemistry, or electrowetting, may also be suitable. Optionally substrate 10 is made of a transparent material for facilitating optical analysis of samples. Substrate 10 is illustrated as a monolithic structure, but alternatively may comprise a laminate of two or more layers.

Microfluidic channels (also referred to in the art and herein as trenches) 14 are exposed at an upper surface 10a of substrate 10, wherein the term "upper" is used in reference to the orientation depicted in FIG. 1(d), whereas in FIGS. 3(a) and 3(b) substrate 10 is inverted to cause surface 10a to face downward. A linear array of parallel microfluidic channels 14 is shown in the drawings. While two microfluidic channels 14 are illustrated in the drawings, it should be understood that any multiple (e.g., three, four, five, etc.) of microfluidic channels 14, including multiples in the tens or hundreds, may be present on surface 10a of substrate 10. Alternatively, substrate 10 may include a single microfluidic channel 14. In the event that multiple microfluidic channels 14 are present, microfluidic channels 14 may be isolated of one another channels 14, such as in the case of the linear array shown in FIG. 5. As another alternative, microfluidic channels 14 may have non-linear shapes, and/or may be in communication with one another, for example, to establish networks of flow paths. Optionally, microfluidic channels 14 may also extend vertically, i.e., perpendicular to substrate surface 10a, to establish three-dimensional flow paths or networks.

Upper surface 10a of substrate 10 includes partition walls 13, which define the side surfaces of microfluidic channels 14 and space adjacent microfluidic channels 14 apart from one another. Microfluidic channels 14 are further defined by a base surface, which extends between the opposite side surfaces of microfluidic channel 14. The side surfaces of microfluidic channels 14 are illustrated as planar and set at a 90 degree angle relative to the base surface. Side surfaces of microfluidic channels 14 also are planar and are arranged in parallel relationship to one another to establish a uniform channel width. Each base surface is illustrated parallel with upper surface 10a to establish a uniform depth to microfluidic channels 14. It should be understood that various modifications to the illustrated configuration may be implemented. For example, the side surfaces may be set at obtuse angles relative to the base surface so that the side surfaces diverge away from one another, thereby tapering microfluidic channel 14. Further, the base and side surfaces may be non-planar, e.g., curved or undulating. Furthermore, the side surfaces, which are shown parallel to one another, may be in a non-parallel relationship to cause variation to the channel width. The base and side surface may join with one another without a discrete demarcation angle, as in the case of a microfluidic channel having a U-shaped or semi-circular cross section.

The cross-sectional dimensions of microfluidic channels 14 include a width (between side surfaces) and a depth (from base surface to substrate surface 10a). It is preferred that microfluidic channels 14 have a width less than about 5,000 microns (μm), preferably less than 2,000 microns, for example, in a range of about 10 microns to about 1,000 microns, and for some applications in a range of about 50 microns to about 500 microns. The depth of channels 14 may be the same as or different than the width, but preferably are in the preceding ranges. The length of microfluidic channels 14 may be, for example, about 0.1 cm to about 10 cm, although longer lengths are possible and useful in various applications. If multiple microfluidic channels 14 are provided, microfluidic channels 14 may have the same or different dimensions and shapes relative to one another.

FIGS. 1(b)-1(d) illustrate a standard lithography or nanolithography procedure for forming a linear array of microfluidic channels 14 in upper surface 10a of substrate 10. As shown in FIG. 1(b), a sacrificial mask 12 is deposited onto upper surface 10a. Typically, mask 12 is applied across the entirety of upper surface 10a, then selective portions of mask 12 are removed using known techniques, e.g., electron beam or UV irradiation followed by dissolution. Regions of substrate surface 10a that have been exposed by removal of selective portions of mask 12 are etched to create microfluidic channels 14, as shown in FIG. 1(c). The remainder of mask 12 is removed to produce substrate 10 having microfluidic channels 14. While formation of microfluidic channels 14 has been described with reference to a lithographic technique, it should be understood that other techniques may be practiced for fabricating microfluidic channels 14 in substrate 10. Such techniques include, for example, injection molding, nanoimprinting, micromachining, embossing, stamping, stencil fabrication, and combinations thereof, and others. Several of these and other techniques are described in Choudhury (1997), The Handbook of Microlithography, Micromachining, and Microfabrication, Soc. Photo-Optical Instru. Engineer, Bard & Faulkner (1997) Fundamentals of Microfabrication.

Figure 2:
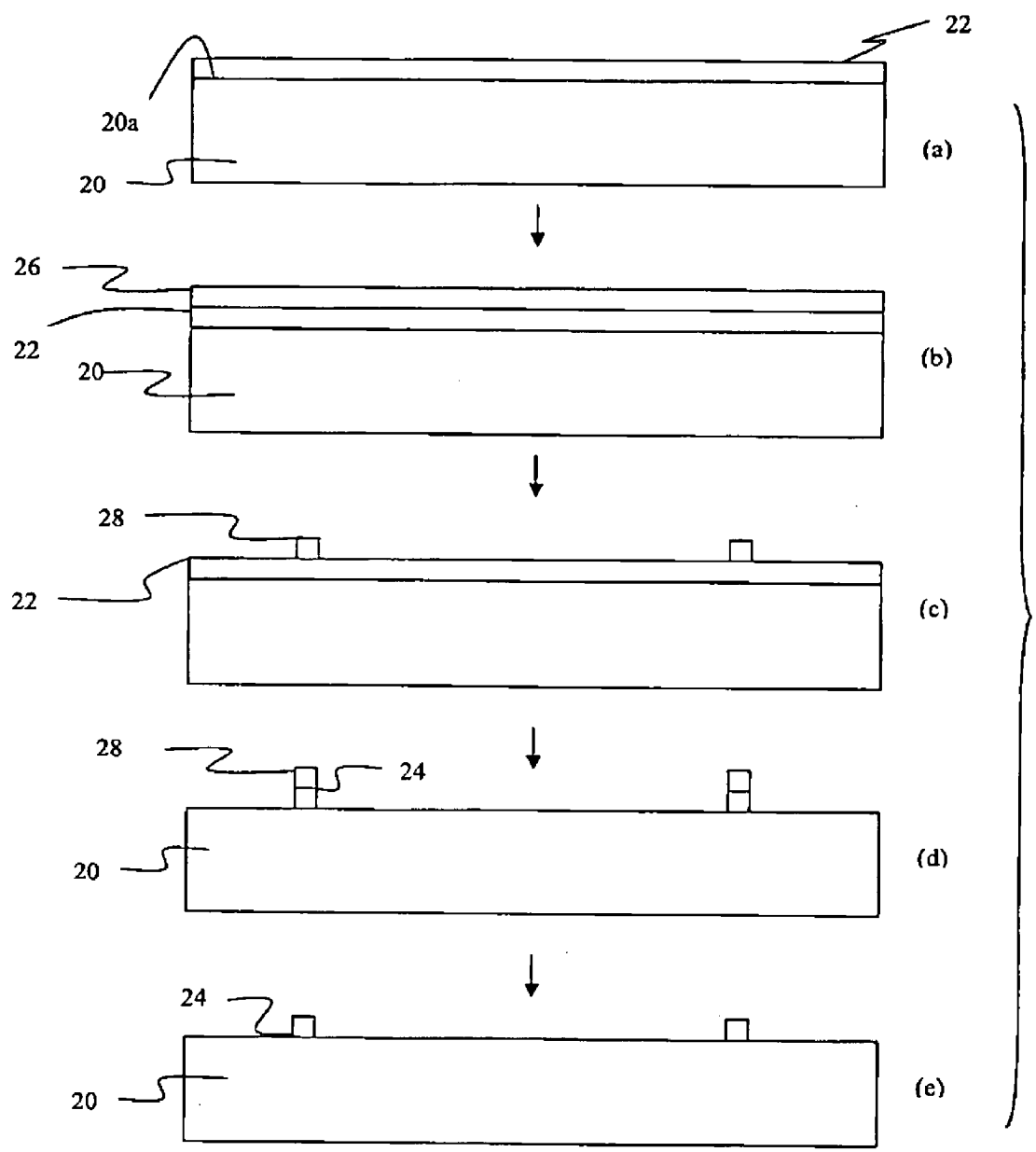
FIGS. 2(a) through 2(e) are schematic illustrations of a sequence of steps of a sol-gel spin coating and lithographic procedure for developing permeable walls on a substrate.

Turning now to FIGS. 2(a)-(d), process steps of an embodiment for patterning permeable walls 24 on a substrate 20, as shown in FIG. 2(e) will be described. The examples of materials set forth above for substrate 10 are also suitable for substrate 20. Substrate 20 may comprise a monolithic structure made of a common material or a laminate of a plurality of layers of the same or different materials. Substrate 20 may be made of the same material or a different material than substrate 10. Substrates 10 and 20 may possess the same or different dimensions, shapes, and other characteristics relative to one another.

Preferably, permeable walls 24 (FIGS. 2(d) and 2(e)) positioned on substrate surface 20a are made of sol-gel. As shown in FIG. 2(a), a sol-gel solution is deposited onto upper surface 20a of substrate using, for example, spin coating techniques, to establish sol-gel layer 22, which is cured. Curing temperature will depend upon the particular sol-gel material selected. The cure may be conducted at room or elevated temperature, and may evaporate solvent from the sol-gel.

Sol-gels are commercially available from sources such as NoiseMeters Limited. Alternatively, sol-gels may be fabricated and patterned using standard procedures known in the art. An example of a sol-gel fabrication and patterning procedure suitable for forming permeable walls 24 on upper surface 20a of substrate 20 is illustrated in FIGS. 2(a)-2(e). Sol-gel materials capable of being formed into permeable structures suitable for use with the present invention are known. Sol-gel materials are described in the literature, such as in PCT International Publication No. WO 01/58562, which discloses sol-gel fabrication materials and fabrication process steps suitable for embodiments of the present invention. The PCT publication describes a process for making a sol-gel solution which may be adapted for the present invention, in which a mixture is prepared of sol-gel precursors (e.g., tetramethyloxysilane and N-Octyldecyl-dimethyl[3-(trimethoxy-silyl)propyl]ammonium chloride), a deactivation agent (e.g., phenyldimethylsilane), and a catalyst (e.g., trifluoroacetic acid). The mixture is vortexed, subjected to a precipitate-separation step, then supernatant is decanted to provide the sol-gel solution.

Deposited and cured sol-gel layer 22 is patterned into permeable walls 24 having predetermined dimensions and configurations as follows. A mask coating 26 is uniformly applied over sol-gel layer 22, as shown in FIG. 2(b). Next, as shown in FIG. 2(c), using standard lithography resist coating 26 is patterned into masks 28. Although not shown, additional masking layers may be used. For example, an aluminum layer or layer made of another material may be interposed between sol-gel layer 22 and resist coating 26, for example, to serve as an impermeable or etch-resistant barrier between resist coating 26 and sol-gel layer 22. Regions of sol-gel film 22 not covered by masks 28 are then etched, for example, using dry or wet etching, such as reactive ion etching or ion milling, so that sol-gel film 22 is patterned into one or more permeable walls 24 under masks 28, as shown in FIG. 2(d). Masks 28 are then stripped away to leave patterned, self-supporting permeable walls 24 coated on substrate 20, as shown in FIG. 2(e).

FIG. 2(e) shows a pair of permeable walls 24 protruding from an upper surface 20a of substrate 20. It should be understood that any multiple (e.g., three, four, five, etc.) of permeable walls 24, including multiples in the tens or hundreds, may be present on upper surface 20a. Alternatively, a single permeable wall 24 may be present on upper surface 20a. Preferably, the number of permeable walls 24 is the same as the number of microfluidic channels 14. Optionally, microfluidic channels 14 may outnumber permeable walls 24, in which case one or more of microfluidic channels 14 will not receive a corresponding permeable wall 24 when substrates 10 and 20 are assembled together.

In the illustrated embodiments, permeable walls 24 have identical widths and heights relative to one another. It should be understood that, as with the case of microfluidic channels 14 described above, permeable walls 24 may differ in width, height, and/or length from one another. Also, permeable walls 24 may be made of the same or different materials relative to one another, and may possess the same or different shapes and other attributes relative to one another.

The formation of permeable walls 24 has been described hereinabove as a sol-gel process. It should be understood that other porous and granular materials may be selected for permeable walls 24. Granular materials such as porous silicon prepared by anodic etching of bulk p-type silicon in hydrofluidic acid solution also may be selected for permeable walls 24. Other methods include drop coating, spraying, evaporation, sputtering, and chemical vapor deposition.

Optionally, permeable walls 24 may be doped with metal, such as in the case of metallic nanoparticle-impregnated sol-gels found in surface-enhanced Raman (SER) spectroscopy applications. Suitable metals include, but are not limited to, silver and gold. In the event that sol-gel layer 22 is doped with metal, such as metallic nanoparticles, sol-gel layer may be treated with a surface agent to reduce the metallic nanoparticles.

The embodied method further features assembling the substrates together to seal the microfluidic channels, with the permeable walls inserted into and partially or completely filling the microfluidic channels.

FIG. 3(a) illustrates substrate 10 in an inverted position relative to FIG. 1(d), so that microfluidic channels 14 open downward. Permeable walls 24 are each aligned below a corresponding microfluidic channel 14 in preparation of assembly. Alignment is facilitated by selecting predetermined, matching patterns for walls 24 and channels 14. Computer automation in the patterning of walls 24 and/or channels 14 can foster alignment. FIG. 3(b) illustrates substrates 10 and 20 assembled together. As assembled, substrate 20 mechanically interfaces with microfluidic channels 14 and serves as a non-permeable boundary structure to seal microfluidic channels 14. Permeable walls 24 on substrate 20 are aligned with and inserted into their corresponding microfluidic channels 14, thereby at least partially filling the cross-sectional areas sealed channels 14 with permeable walls 24. Substrates 10 and 20 are joined to one another, optionally via adhesive bonding, mechanical fasteners (e.g., clamps), or any other suitable joining mechanism for temporarily or permanently retaining substrates 10 and 20 together.

The extent to which a permeable wall 24 partially or completely fills a cross-sectional area of a corresponding microfluidic channel 14 depends upon the difference between the cross-sectional dimensions of microfluidic channel 14 and the cross-sectional dimensions of corresponding permeable wall 24. In the embodiment illustrated in FIG. 3(*b*), each permeable wall 24 has a width substantially equal to the width of its corresponding microfluidic channel 14. The term "substantially equal" is intended to encompass an embodiment in which the opposite sides of permeable wall 24 simultaneously contact the side walls of its corresponding microfluidic channel 14. It should be understood that the width of a permeable wall 24 is at least slightly less than the width of its corresponding microfluidic channel 14 so as to allow permeable wall 24 to be inserted into and received in its corresponding channel 14 without damaging permeable wall 24. It is within the scope of the invention to select a greater difference between the width of channel 14 and the width of wall 24, for example, so that gaps are formed on opposite sides of permeable wall 24, i.e., between the opposite side surfaces of permeable wall 24 and the side surfaces of its corresponding channel 14.

Figure 3:
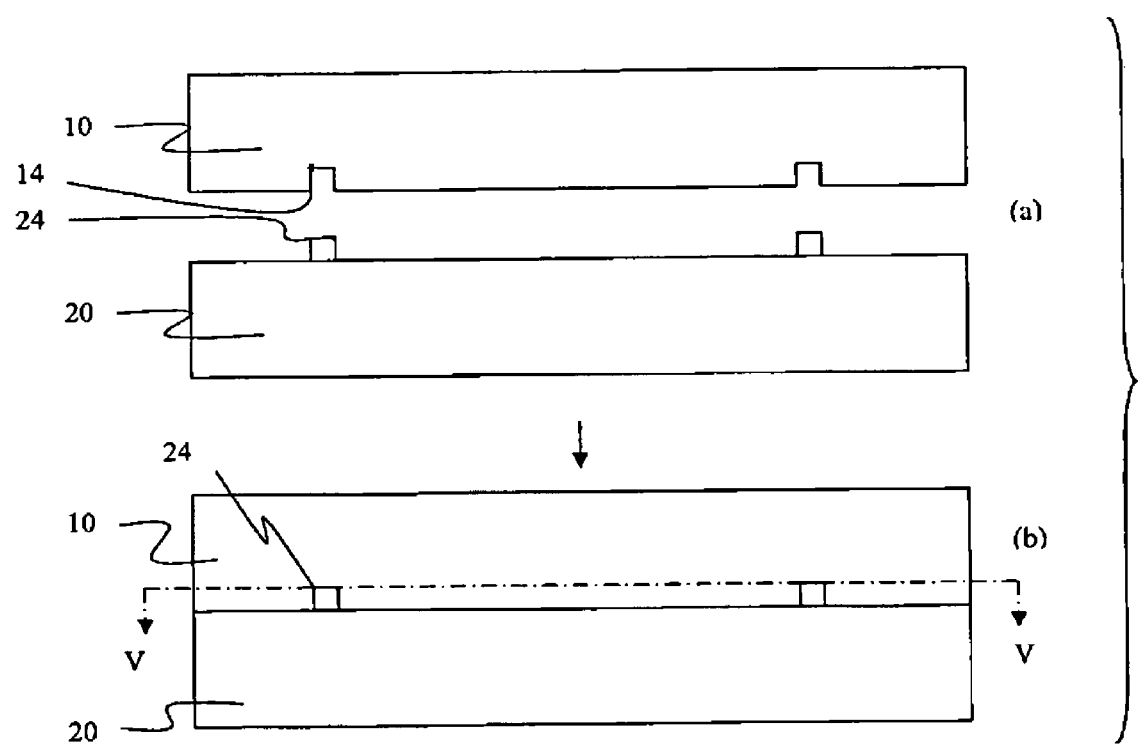
FIGS. 3(a) and 3(b) are schematic illustrations of a sequence of steps of an assembling procedure.
Figure 4:
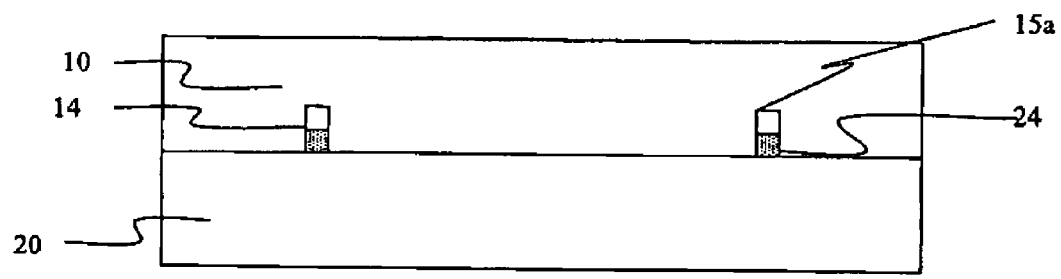
FIG. 4 is a cross-sectional side view of an alternative embodiment of the invention.

In the embodiment illustrated in FIG. 3(*b*), the height of permeable wall 24 is substantially equal to the depth of microfluidic channel 14, causing permeable wall 24 to essentially fill the entirety of microfluidic channel 14 and contact the base surface of microfluidic channel 14. FIG. 4 illustrates an alternative embodiment in which permeable wall 24 has a height that is less than the depth of microfluidic channel 14. A gap 15*a* between the top of permeable wall 24 and the base surface of microfluidic channel 14 provides an unobstructed or vacant flow path above wall 24 extending longitudinally along the entire length of permeable wall.

Figure 5:
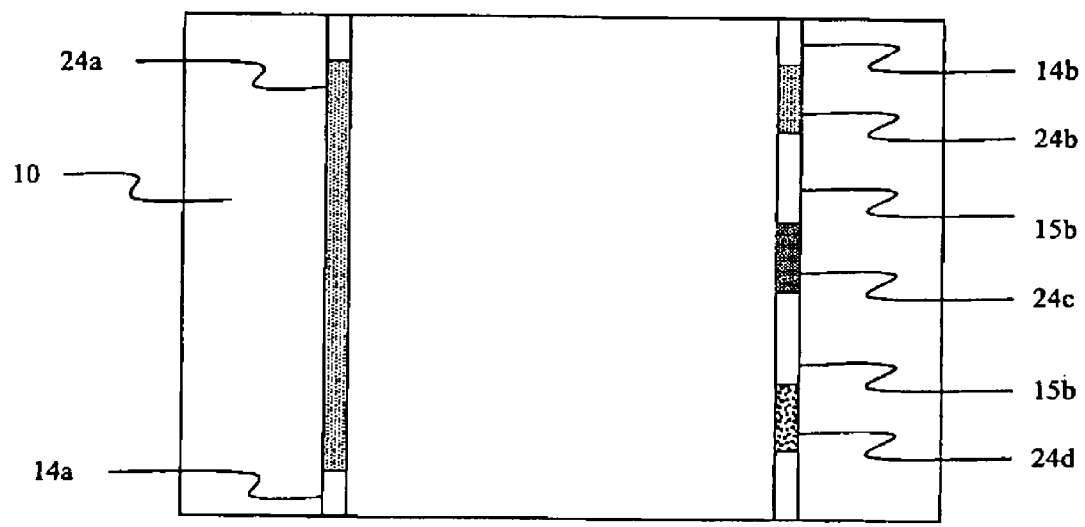
FIG. 5 is a cross-sectional top view taken along sectional line V-V of FIG. 3.

FIG. 5 illustrates a cross-sectional top view of the assembly depicted in FIG. 3, taken along sectional line V-V of FIG. 3. Permeable wall 24*a* on the left-hand side of substrate 10 completely fills the cross-sectional area of corresponding microfluidic channel 14*a*, leaving no gaps or empty areas on the opposite sides of wall 24. While permeable wall 24*a* has been illustrated filling less than the entire length of channel 14*a*, it should be understood that the entire length of channel 14*a* may be filled with permeable wall 24*a*. Microfluidic channel 14*b* on the right-hand side of substrate 10 possesses a plurality of discrete permeable wall segments 24*b*, 24*c*, and 24*d*, separated from one another by and alternating with longitudinal gaps 15*b*. Discrete permeable wall segments 24*b*, 24*c*, 24*d* may be made of the same or different materials from one another. It may be desirable to select different materials for discrete permeable wall segments 24*b*, 24*c*, 24*d* so that wall segments 24*b* separate (as in the case of, for example, chromatography) or distinguish (as in the case of, for example, spectrometry) different constituents or agents of the sample. Gaps 15*b* may be omitted to place wall segments 24*b*, 24*c*, 24*d* in contact with one another.

Figure 6:
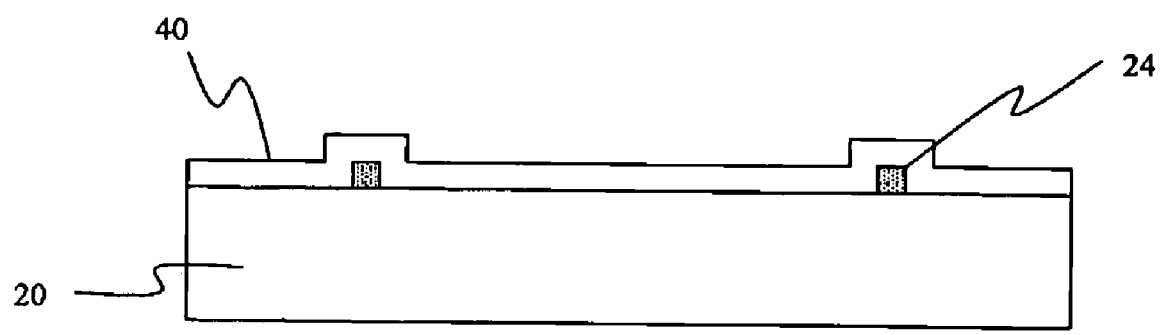
FIG. 6 is a cross-sectional view of still another alternative embodiment.

Referring to FIG. 6, another embodiment of the invention is shown. The microfluidic device shown in FIG. 6 is prepared by patterning permeable walls 24 on substrate 20, as described in detail above in reference to FIGS. 2(*a*) through 2(*e*), or using other techniques mentioned above. A common coating 40 is then applied over permeable walls 24. Coating 40 serves as a non-permeable or semi-permeable boundary structure to convert the space occupied by permeable walls 24 into microfluidic channels filled with the permeable wall material. Coating 40 preferably is in a flowable state when applied, and is hardenable into a non-permeable or semi-permeable solid. Other deposition techniques such as chemical vapor deposition may be used for depositing coating 40. Coating 40 may be, for example, a metallic or polymeric material.

In the interest of simplification, the drawings show microfluidic channels and permeable walls 24 in substantial isolation of associated components commonly found in microfluidic devices. It should be understood that the microfluidic devices described herein may possess a more complex architecture, such as encountered with lab-on-chip, MEM, and bio-MEM systems. The microfluidic device may contain additional structural and mechanical components for carrying out its intended use. For example, each microfluidic channel may be associated with a corresponding reservoir (also known as a well) at one end of the microfluidic channel. Each well may be linearly aligned with its corresponding microfluidic channel. Alternatively, a microfluidic channel can be connected to more than one reservoir to provide multiple samples and optionally other components, e.g., buffers, to a microfluidic channel. A reservoir also can serve as a common source for more than one of the microfluidic channels. Commercially available pumps, such as used for liquid chromatography, may be connected to the wells for applying pressure to the samples in the well. A detection device is optionally provided at the opposite end for performance of chemical or biochemical identification or detection. The detection devices may be provided for carrying out, for example, mass spectrometry, ultra-violet absorption spectroscopy, laser-induced fluorescence spectroscopy, etc. Other microcomponents known in the art, such as microvalves, mixers, etc., may be associated with microfluidic channels 14 for selectively controlling communication between channels 14 and other functions.

The microfluidic devices embodied herein may be stacked upon one another to create a three-dimensional array of packed microfluidic channels. Mechanical fasteners or bonding agents may be used for retaining the microfluidic devices in a stacked relationship.

The various methods embodied in this detailed specification and more broadly described in the summary of the invention are suitable for making microfluidic devices finding applicability in a number of uses, including, for example, the in-situ detection, isolation, and identification of unknown chemicals using techniques such as chromatographic separation and spectrometry. Impregnation of metal nanoparticles into the microfluidic devices is believed to enhance the Raman signal (surface enhanced Raman or SER) from various compounds (e.g. amino acids, purines, pyrimadines, and polycyclic aromatic hydrocarbons) by orders of magnitude, thereby enabling Raman detection and identification of dilute organic compounds. Generally, operations with the microfluidic devices will involve introduction of a sample fluid at a first end of a microfluidic channel. The fluid may be liquid and/or gas. The sample fluid may be pumped into the channel from a reservoir or well, or injected directly into the microfluidic channel manually or using robotics. The sample is separated into its constituents or agents as it passes, partially or completely, through the permeable wall(s). For example, certain constituents of the sample may not pass completely through the permeable walls due to their interaction with the permeable materials. Other sample constituents, such as the medium, may pass through the entirety of the permeable wall. A spectrometer may be placed at the opposite end or along the microfluidic channel for analysis.

While this invention has been described as having a preferred design, it is understood that it is capable of further modifications, uses and/or adaptations of the invention, following in general the principle of the invention and including such departures from the present disclosure as come within known or customary practice in the art to which the invention pertains, and as may be applied to the central features hereinbefore set forth, and fall within the scope of the invention of the limits of the appended claims.

What is claimed is:

1. A method of making a microfluidic device, comprising:
   patterning a permeable wall on a substrate; and
   surrounding the permeable wall, on at least three surfaces, with a solid, non-permeable boundary structure to establish a microfluidic channel having a cross-sectional dimension less than 5,000 microns and a cross-sectional area at least partially filled with the permeable wall so that fluid flowing through the microfluidic channel at least partially passes through the permeable wall.

2. The method of claim 1, wherein:
   said patterning comprising patterning a plurality of permeable walls on the substrate; and
   said surrounding comprises separately surrounding each of the permeable walls with the solid, non-permeable boundary structure to establish a plurality of microfluidic channels isolated from one another.

3. The method of claim 1, wherein said patterning comprises patterning the permeable wall from a sol-gel material.

4. The method of claim 1, wherein the permeable wall is impregnated with nano-particles.

5. The method of claim 1, wherein the cross-sectional area of the microfluidic channel is partially yet not completely filled with the permeable wall.

6. The method of claim 1, wherein the cross-sectional area of the microfluidic channel is completely filled with the permeable wall.

7. The method of claim 1, wherein the cross-sectional dimension of the microfluidic channel is a width of less than 500 microns.

8. The method of claim 1, wherein the permeable wall comprises first and second regions positioned at different longitudinal positions along the length of the microfluidic channel, wherein the first region of the permeable wall is made of a different material than the second region of the permeable wall.

9. A method of making a microfluidic device, comprising:
   patterning a permeable wall on a first substrate,
   providing a second substrate comprising a substrate surface with a microfluidic channel therein, the microfluidic channel having a cross-sectional dimension less than 5,000 microns and a cross-sectional area; and
   assembling the first and second substrates together to insert the permeable wall into the microfluidic channel with the permeable wall at least partially filling the cross-sectional area of the microfluidic channel so that fluid flowing through the microfluidic channel at least partially passes through the permeable wall.

10. The method of claim 9, wherein:
    said patterning comprising patterning a plurality of permeable walls on the substrate;
    said providing comprises providing the second substrate with a plurality of microfluidic channels; and
    said assembling comprises inserting each of the permeable walls into a corresponding one of the microfluidic channels with the permeable walls at least partially filling the corresponding microfluidic channels so that fluid flowing through the microfluidic channels at least partially passes through the permeable walls.

11. The method of claim 9, wherein said patterning comprises patterning the permeable wall from a sol-gel material.

12. The method of claim 9, wherein the permeable wall is impregnated with nano-particles.

13. The method of claim 9, wherein the cross-sectional area of the microfluidic channel is partially yet not completely filled with the permeable wall.

14. The method of claim 9, wherein the cross-sectional area of the microfluidic channel is completely filled with the permeable wall.

15. The method of claim 9, wherein the cross-sectional dimension of the microfluidic channel is a width of less than 500 microns.

16. The method of claim 9, wherein the permeable wall comprises first and second regions positioned at different longitudinal positions along the length of the microfluidic channel, wherein the first region of the permeable wall is made of a different material than the second region of the permeable wall.

17. The method of claim 9, further comprising patterning the microfluidic channel in the second substrate.

18. The method of claim 9, further comprising bonding the first and second substrates to one another.

19. A method of making a microfluidic device, comprising:
    patterning a permeable wall on a substrate; and
    applying a non-permeable or semi-permeable coating around at least three surfaces of the permeable wall to establish a microfluidic channel having a cross-sectional dimension less than 5,000 microns and a cross-sectional area at least partially filled with the permeable wall so that fluid flowing through the microfluidic channel at least partially passes through the permeable wall.

20. The method of claim 19, wherein:
    said patterning comprising patterning a plurality of permeable walls on the substrate; and
    said applying comprises separately coating each of the permeable walls with a common coating to establish a plurality of microfluidic channels isolated from one another.

21. The method of claim 19, wherein said patterning comprises patterning the permeable wall from a sol-gel material.

22. The method of claim 19, wherein the permeable wall is impregnated with nano-particles.

23. The method of claim 19, wherein the cross-sectional area of the microfluidic channel is partially yet not completely filled with the permeable wall.

24. The method of claim 19, wherein the cross-sectional area of the microfluidic channel is completely filled with the permeable wall.

25. The method of claim 19, wherein the cross-sectional dimension of the microfluidic channel is a width of less than 500 microns.

26. The method of claim 19, wherein the permeable wall comprises first and second regions positioned at different longitudinal positions along the length of the microfluidic channel, wherein the first region of the permeable wall is made of a different material than the second region of the permeable wall.

* * * * *